(12) United States Patent
Kim

(10) Patent No.: US 8,000,092 B2
(45) Date of Patent: Aug. 16, 2011

(54) DISPLAY APPARATUS

(75) Inventor: Kwey-hyun Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 274 days.

(21) Appl. No.: 11/503,209

(22) Filed: Aug. 14, 2006

(65) Prior Publication Data

US 2007/0047188 A1  Mar. 1, 2007

(30) Foreign Application Priority Data

Aug. 23, 2005 (KR) .................. 10-2005-0077319

(51) Int. Cl.
G06F 1/16 (2006.01)
H05K 7/00 (2006.01)
H05K 5/00 (2006.01)

(52) U.S. Cl. .................. 361/679.21; 248/917

(58) Field of Classification Search .................. 361/681, 361/679.21, 679.22; 348/58; 248/127, 130, 248/131, 349.1, 415, 418, 919

See application file for complete search history.

(56) References Cited

U.S. PATENT DOCUMENTS

| 2,041,370 | A | * | 5/1936 | Pottorff | 248/129 |
| 2,628,142 | A | * | 2/1953 | Dubach | 248/413 |
| 4,354,654 | A | * | 10/1982 | Werner et al. | 248/349.1 |
| 4,549,714 | A | * | 10/1985 | Busch | 248/131 |
| 4,781,347 | A | * | 11/1988 | Dickie | 248/663 |
| 4,880,191 | A | * | 11/1989 | Lake, Jr. | 248/923 |
| 5,209,446 | A | * | 5/1993 | Kawai | 248/131 |
| 5,375,076 | A | * | 12/1994 | Goodrich et al. | 361/681 |
| 5,388,792 | A | * | 2/1995 | Hastings et al. | 248/188.1 |
| 5,569,895 | A | * | 10/1996 | Lynch et al. | 361/679.4 |
| 5,582,373 | A | * | 12/1996 | Baudot | 248/166 |
| 5,588,625 | A | * | 12/1996 | Beak | 248/371 |
| 5,697,588 | A | * | 12/1997 | Gonzalez et al. | 248/131 |
| 5,715,137 | A | * | 2/1998 | Choi | 361/679.07 |
| 5,805,415 | A | * | 9/1998 | Tran et al. | 361/681 |
| 5,887,962 | A | * | 3/1999 | Tsai | 312/351.9 |
| 5,927,673 | A | * | 7/1999 | Kurokawa et al. | 248/456 |
| 5,934,774 | A | * | 8/1999 | Wu et al. | 312/223.2 |
| 6,028,764 | A | * | 2/2000 | Richardson et al. | 361/681 |
| 6,045,103 | A | * | 4/2000 | Costa et al. | 248/279.1 |
| 6,219,228 | B1 | * | 4/2001 | Sun | 361/679.21 |
| 6,227,518 | B1 | * | 5/2001 | Sun | 248/923 |
| 6,268,997 | B1 | * | 7/2001 | Hong | 361/679.07 |
| 6,275,375 | B1 | * | 8/2001 | Nam | 361/679.22 |
| 6,288,893 | B1 | * | 9/2001 | Faranda et al. | 361/679 |

(Continued)

FOREIGN PATENT DOCUMENTS

JP  08-179425  7/1996

(Continued)

OTHER PUBLICATIONS

European Search Report dated May 30, 2007 issued in EP 6119402.

*Primary Examiner* — Jinhee J Lee
*Assistant Examiner* — Adrian S Wilson
(74) *Attorney, Agent, or Firm* — Stanzione & Kim, LLP

(57) ABSTRACT

A display apparatus having an improved supporting configuration of a display part, which includes a display to display an image thereon and a pair of bases which are coupled to the display to rotate around an axis of upward and downward directions with respect to a vertical line of the display.

18 Claims, 8 Drawing Sheets

U.S. PATENT DOCUMENTS

| | | | | |
|---|---|---|---|---|
| 6,311,941 B1* | 11/2001 | Feldmeyer | | 248/188.8 |
| 6,370,020 B1* | 4/2002 | Toukairin | | 361/679.22 |
| 6,536,721 B1* | 3/2003 | Kao | | 248/131 |
| 6,603,656 B2* | 8/2003 | Cho et al. | | 361/683 |
| 6,712,326 B2* | 3/2004 | Kurimoto et al. | | 248/371 |
| 6,781,820 B2* | 8/2004 | Cheng | | 361/681 |
| 6,801,426 B2* | 10/2004 | Ichimura | | 248/349.1 |
| 6,814,416 B2* | 11/2004 | Helot et al. | | 312/223.2 |
| 6,837,469 B2* | 1/2005 | Wu et al. | | 248/278.1 |
| 6,874,744 B2* | 4/2005 | Rawlings et al. | | 248/130 |
| 6,880,796 B2* | 4/2005 | Khor et al. | | 361/681 |
| 6,882,529 B2* | 4/2005 | Helot et al. | | 361/683 |
| 6,899,311 B1* | 5/2005 | Ternus | | 248/454 |
| 6,994,303 B2* | 2/2006 | Lin et al. | | 248/919 |
| 7,002,793 B2* | 2/2006 | Imsand | | 361/679.04 |
| 7,019,786 B2* | 3/2006 | Lee | | 361/679.21 |
| 7,023,499 B2* | 4/2006 | Williams et al. | | 348/836 |
| 7,100,880 B2* | 9/2006 | Oddsen, Jr. | | 248/919 |
| 7,114,694 B2* | 10/2006 | Li | | 248/677 |
| 7,133,280 B2* | 11/2006 | Love | | 361/681 |
| 7,168,665 B2* | 1/2007 | Hong et al. | | 361/679.21 |
| 7,195,214 B2* | 3/2007 | Lee et al. | | 361/679.21 |
| 7,215,538 B1* | 5/2007 | Chen et al. | | 248/280.11 |
| 7,252,350 B2* | 8/2007 | Chen et al. | | 312/223.2 |
| 7,269,001 B2* | 9/2007 | Huang | | 361/683 |
| 7,301,759 B2* | 11/2007 | Hsiung | | 361/681 |
| 7,328,880 B2* | 2/2008 | Helot et al. | | 361/681 |
| 7,364,126 B2* | 4/2008 | Tsai et al. | | 361/679.27 |
| 2002/0149905 A1* | 10/2002 | Jackson, Jr. | | 361/681 |
| 2002/0174519 A1* | 11/2002 | Huang | | 16/319 |
| 2003/0001058 A1* | 1/2003 | Oddsen, Jr. | | 248/314 |
| 2003/0081376 A1* | 5/2003 | Helot et al. | | 361/683 |
| 2004/0008476 A1* | 1/2004 | Cheng | | 361/681 |
| 2004/0085718 A1* | 5/2004 | Imsand | | 248/917 |
| 2005/0050784 A1* | 3/2005 | Bang et al. | | 40/607.01 |
| 2005/0051692 A1 | 3/2005 | Jung et al. | | |
| 2005/0243505 A1* | 11/2005 | Jackson | | 361/683 |
| 2006/0219849 A1* | 10/2006 | Chiu | | 248/125.8 |
| 2007/0194184 A1* | 8/2007 | Jang | | 248/131 |

FOREIGN PATENT DOCUMENTS

| | | |
|---|---|---|
| JP | 8-204348 | 8/1996 |
| JP | 10-333594 | 12/1998 |
| KR | 2004-26263 | 3/2004 |
| KR | 2004-32278 | 4/2004 |
| KR | 2005-55800 | 6/2005 |

* cited by examiner

DISPLAY APPARATUS

CROSS-REFERENCE TO RELATED APPLICATIONS

This application claims the priority of Korean Patent Application No. 2005-0077319, filed on Aug. 23, 2005, in the Korean Intellectual Property Office, the disclosure of which is incorporated herein by reference.

BACKGROUND OF THE INVENTION

1. Field of the Invention

The present general inventive concept relates to a display apparatus, and more particularly, to a display apparatus having an improved supporting configuration of a display part.

2. Description of the Related Art

Generally, a display apparatus refers to a TV, a monitor, etc. The display apparatus comprises a display part to display an image thereon and a base part to support the display part.

The display part employs a cathode ray tube (CRT), a liquid crystal display (LCD) and a plasma display panel (PDP) to display the image thereon.

The base part is stably seated on an installing surface such as a table to support the display part.

Recently, the display part provided in the display apparatus has become large-sized to satisfy the need of customers. Various researches are being conducted to support the large-sized display part more safely and easily.

FIG. 1 is an exploded perspective view illustrating a conventional display apparatus 101.

Referring to FIG. 1, the conventional display apparatus 101 comprises a display part 110 to display an image thereon and a base part 170 to support the display part 110.

The display part 110 comprises a liquid crystal display (LCD) panel (not shown) to display the image thereon, a front cover 120 which is provided in front of the LCD panel, and a tear cover 130 which is provided behind the LCD panel. A pair of supporter accommodators 140 are provided on a lower part of the rear cover 130 to accommodate a supporter 190 which is disposed on a upper part of the base part 170 (to be described later).

The base parts 170 are provided as a pair to support the display part 110. The bases parts 170 comprise bases 180 which are installed on an installing surface such as a table, and the supporters 190 which stand in a upper surface of the bases 180.

In the conventional display apparatus 101, the base part 170 can support the display part 110 as the supporters 190 provided in the pair of base parts 170 are inserted and coupled to the supporter accommodators 140 provided in a lower part of the display part 110.

However, when the base parts 170 are separated from the display part 110, the base parts 170 should be additionally packed with the conventional display apparatus 101. Further, users should couple the base parts 170 and the display part 110 by themselves, thereby causing an inconvenience. Also, if the base parts 170 are packed while being coupled to the display part 110, a packaging volume increases.

SUMMARY OF THE INVENTION

Accordingly, it is an aspect of the present general inventive concept to provide a display apparatus which ensures a user's convenience and decreases a packaging volume.

Additional aspects and/or advantages of the present general inventive concept will be set forth in part in the description which follows and, in part, will be obvious from the description, or may be learned by practice of the present general inventive concept.

The foregoing and/or other aspects and utilities of the present general inventive concept may be achieved by providing a display apparatus, comprising a display to display an image thereon, and a base coupled to the display to rotate around an axis of upward and downward directions with respect to a vertical line of the display.

The base may have an elongated plate like shape and may rotate between a folding position in which a lengthwise direction of the base is directed to a leftward and rightward direction as a lengthwise direction of a lower surface of the display and an unfolding position in which the lengthwise direction of the base is directed to a forward and backward direction of the display.

The display apparatus may further comprise a plurality of supporters coupled with the display to be spaced from each other, wherein the base comprises a plurality of bases rotatably coupled with corresponding ones of the supporters.

The display apparatus may further comprise a rotating shaft which to rotatably couple the base and the supporter, wherein the rotating shaft is a hollow tube.

The supporter may comprise a display supporter coupled with the display, and a base supporter rotatably coupled with the bases by the rotating shaft.

The display apparatus may further comprise a rotation angle limiter to limit a rotation angle of the base with respect to the display.

The rotation angle limiter may comprise a guide slot is provided on one of the base and the supporter in a circular arc shape, and a guide projection provided in the other one of the base and the supporter to be accommodated to the guide slot.

A width of the base may be thinner than a thickness of the display.

The base may include a pair of bases spaced apart from each other.

The foregoing and/or other aspects and utilities of the present general inventive concept may also be achieved by providing a display apparatus, comprising a display to display an image thereon, a base, and a supporter coupled between the base and the display such that the base rotates with respect to the display.

The foregoing and/or other aspects and utilities of the present general inventive concept may also be achieved by providing a display apparatus, comprising a display to display an image thereon, a plurality of supporters coupled to the display and spaced-apart from each other, and a plurality of bases rotatably coupled to corresponding ones of the supporters to rotate with respect to the display.

The foregoing and/or other aspects and utilities of the present general inventive concept may also be achieved by providing a support apparatus usable in a display apparatus, the support apparatus comprising a supporter to be received in the display apparatus, a base member to rotate from a folded position to not extend beyond a length and width of the display apparatus and an unfolded position to support the display apparatus, and having a shaft accommodator defined therein, and a rotating shaft to secure the base member to the supporter.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
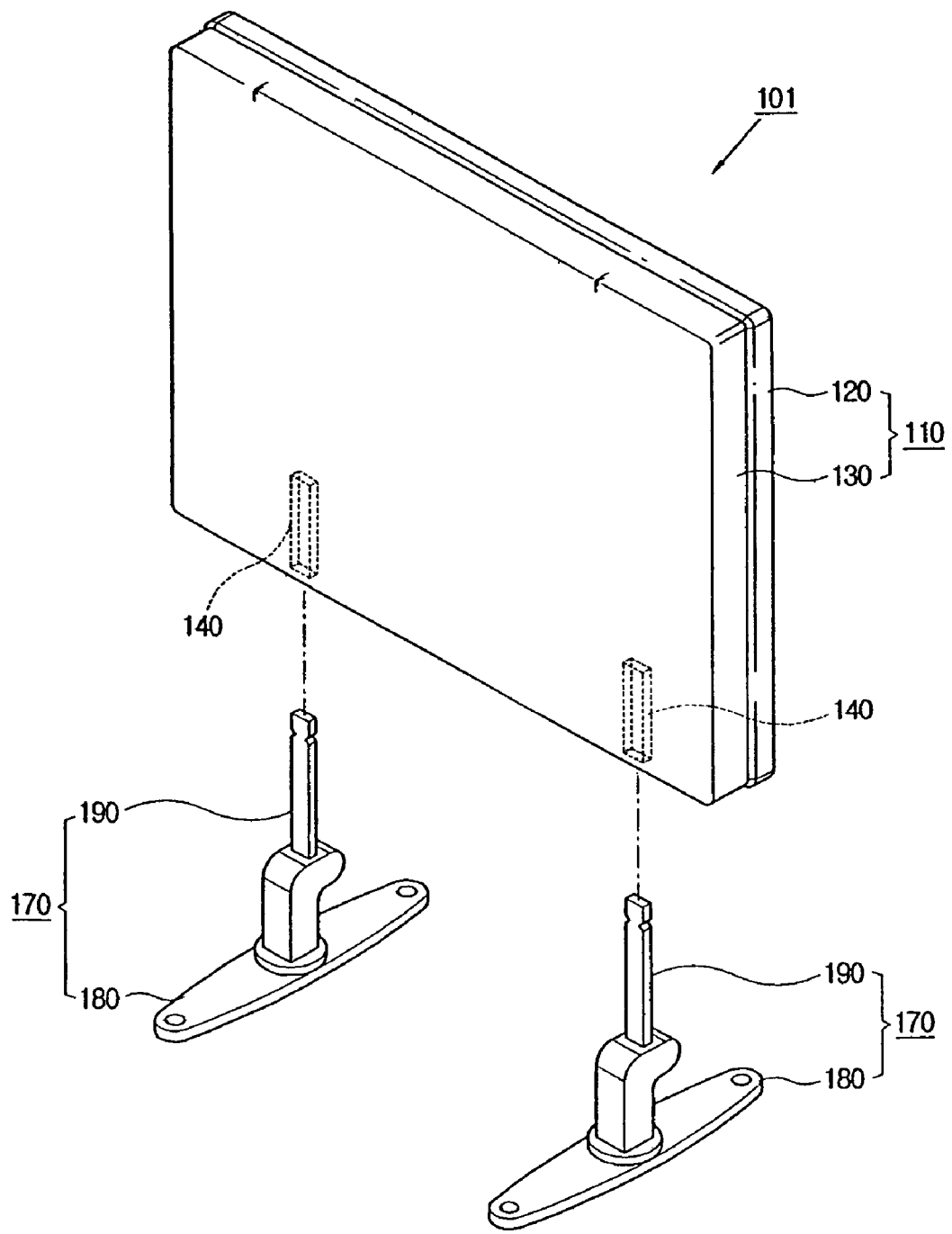
FIG. 1 is an exploded perspective view illustrating a conventional display apparatus.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
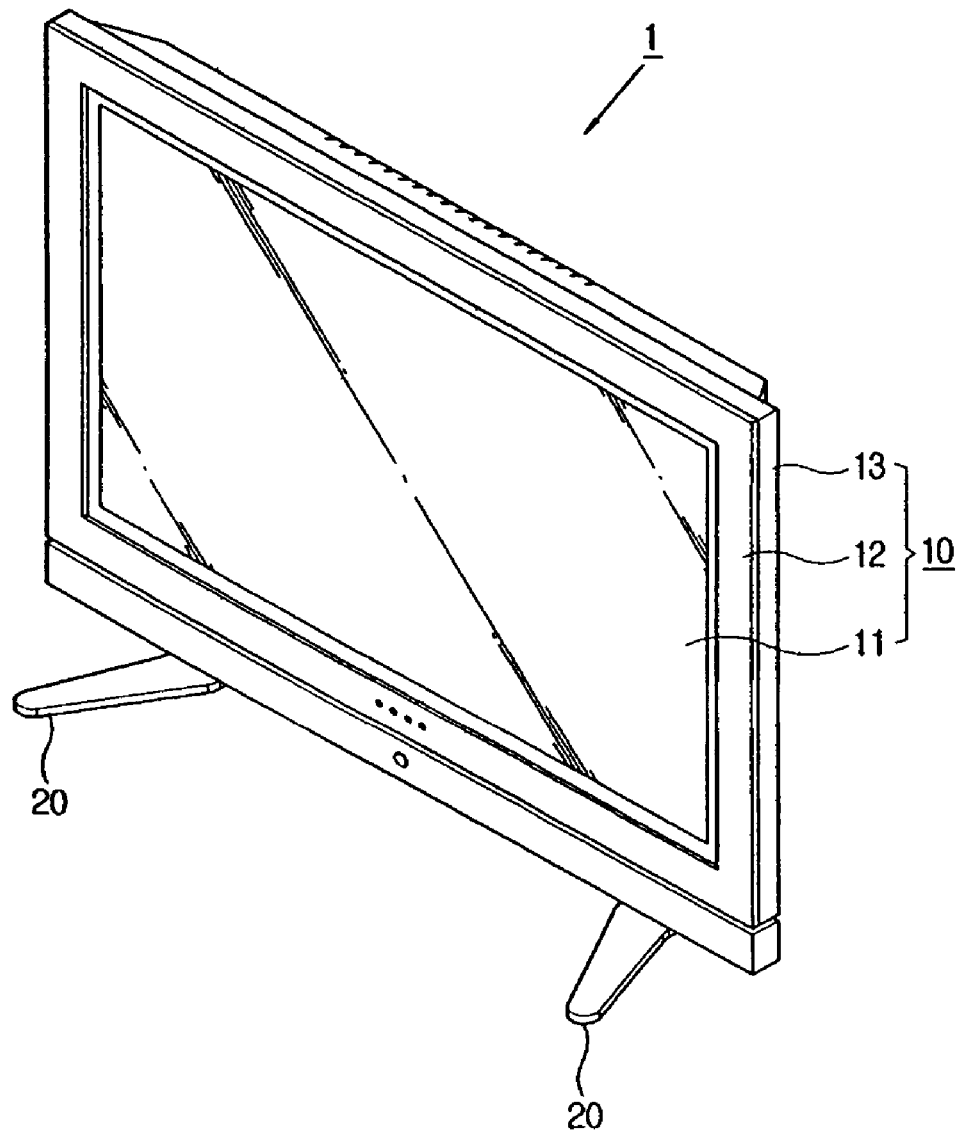
FIG. 2 is a perspective view illustrating a display apparatus according to an embodiment of the present general inventive concept.
Figure 3:
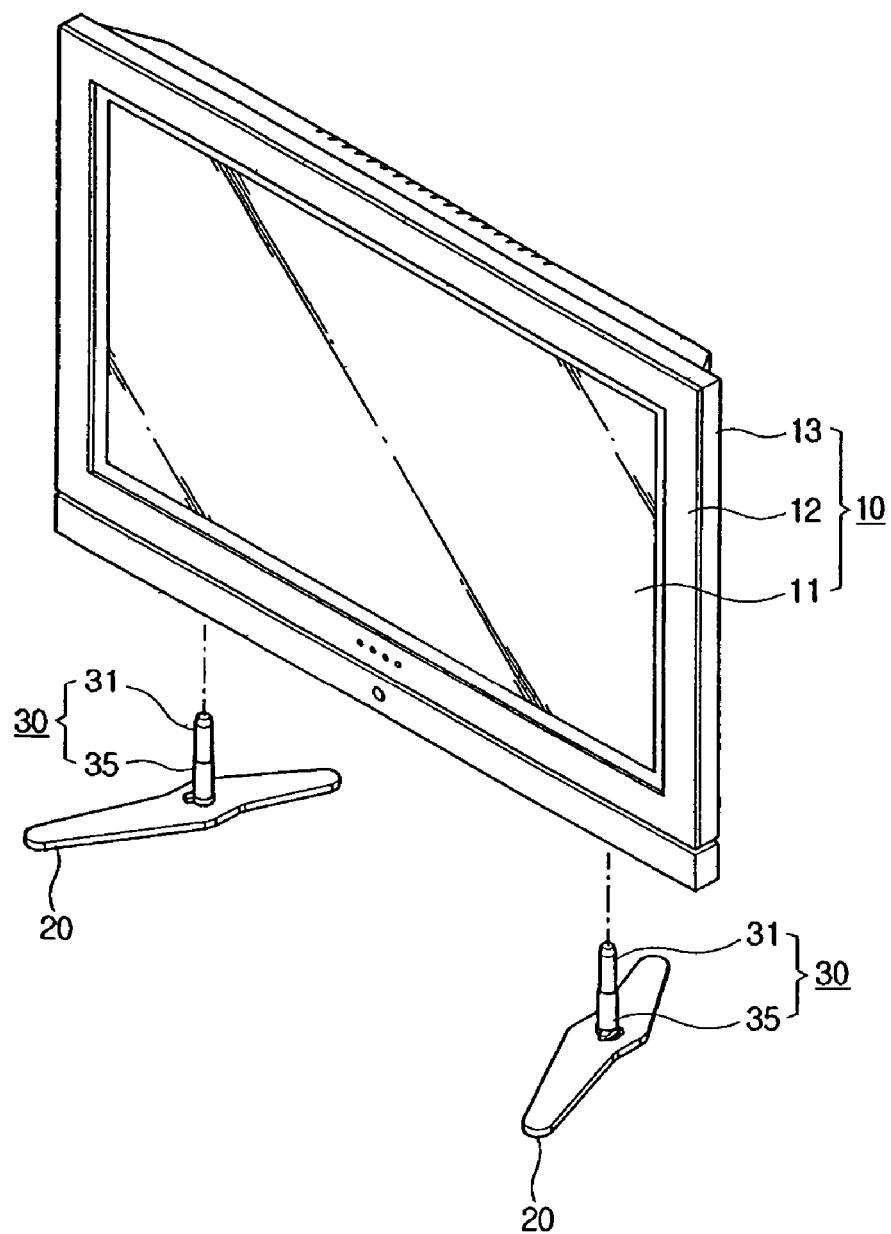
FIGS. 3 and 4 are partial exploded perspective views illustrating the display apparatus of FIG. 2.
Figure 4:
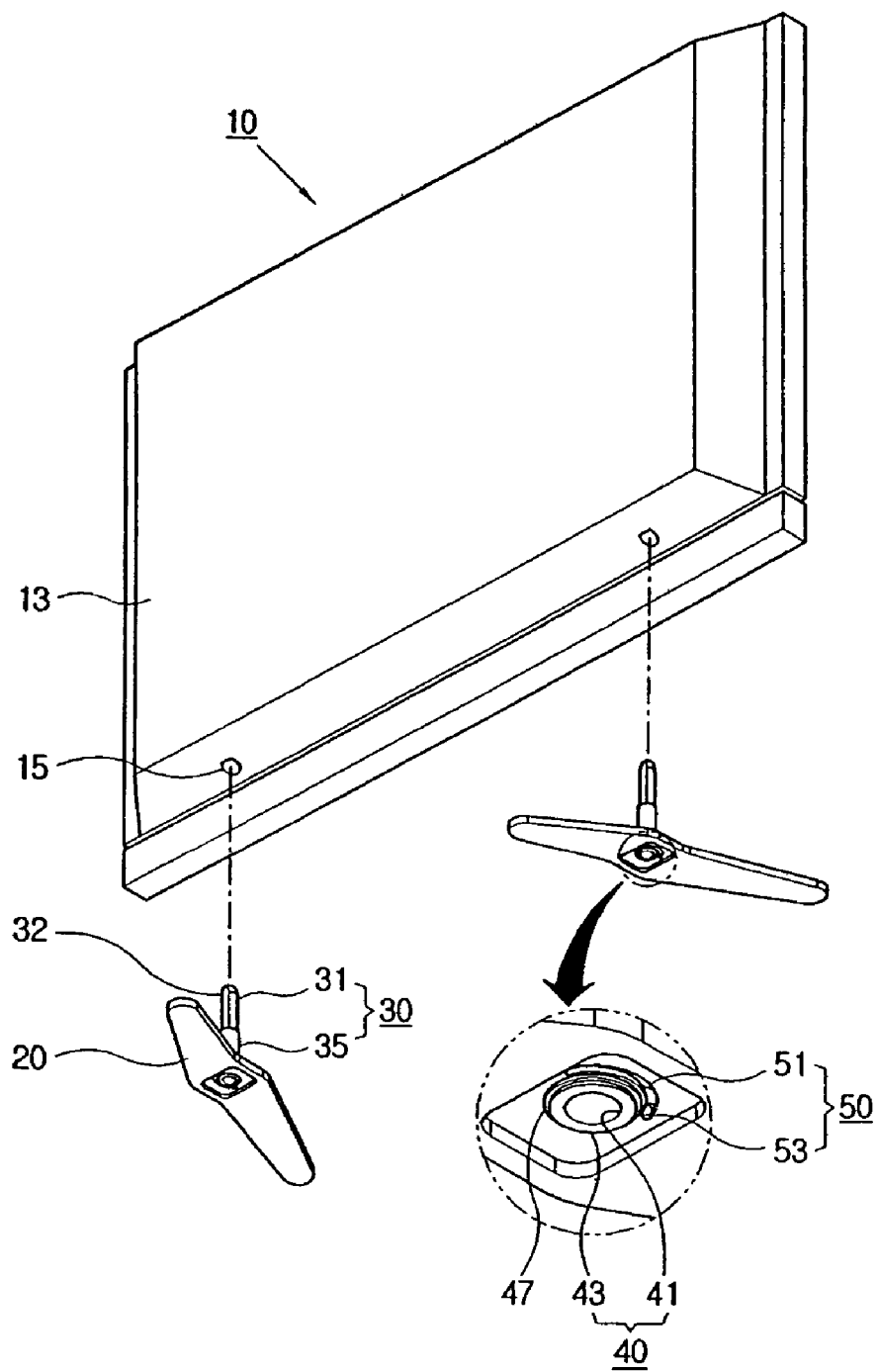
Figure 5:
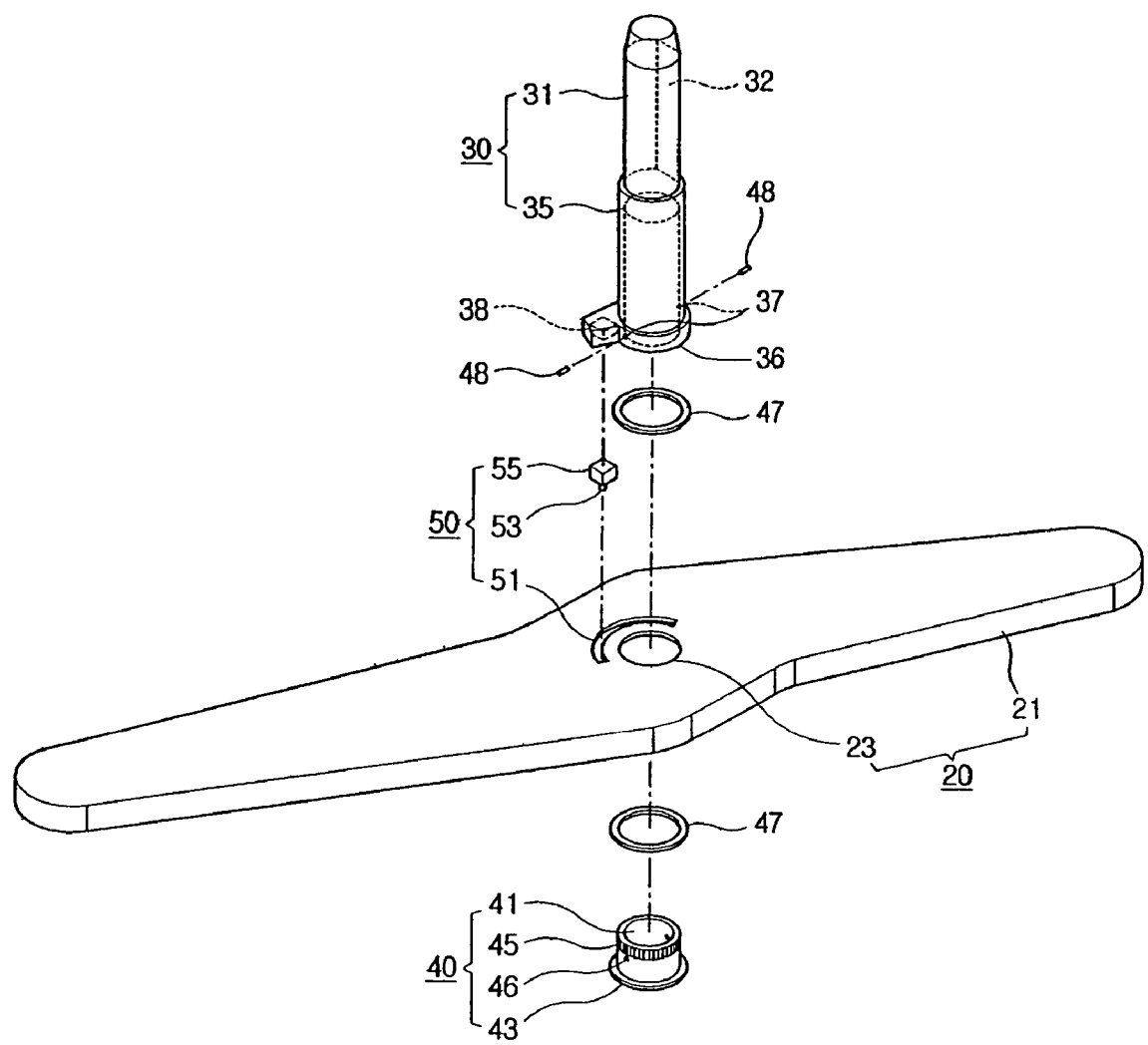
FIG. 5 is an exploded perspective view illustrating bases and supporters of the display apparatus of FIG. 2.

FIG. 2 is a perspective view illustrating a display apparatus 1 according to an embodiment of the present general inventive concept. FIGS. 3 and 4 are partial exploded perspective views illustrating the display apparatus 1 of FIG. 2. FIG. 5 is an exploded perspective view illustrating bases 20 and supporters 30 of the display apparatus 1 of FIG. 2. Referring to FIGS. 2 through 5, the display apparatus 1 comprises a display 10 which displays an image on a major display screen thereof, and the bases 20 which are coupled to the display 10 to rotate around an axis of upward and downward directions with respect to the display 10. For example, the base 20 can move with respect to a line connecting the base 20 and the display 10. The display apparatus 1 according to the present embodiment further comprises the supporters 30 which are spaced from each other and coupled to the display 10 and include the bases 20. The display apparatus 1 according to the present embodiment further comprises a rotating shaft 40 to rotatably couple the base 20 to the supporter 30. The bases 20 can rotate with respect to a long width direction of the support 30 to rotate with respect to the display 10.

As illustrated in FIG. 2, the display 10 may comprise an image display part 11 to display the image thereon, a front cover 12 which is provided in front of the image display part 11, and a rear cover 13 which is provided behind the image display part 11. A supporter accommodator 15 is provided in the display 10 to accommodate the supporter 30 (see FIG. 4).

The image display part 11 may be provided as a liquid crystal display (LCD) panel as an example of the present embodiment, but is not limited thereto. Alternatively, the image display part 11 may be variously provided to include a plasma display panel (PDP).

Referring to FIG. 4, the supporter accommodator 15 is formed on a lower surface of the display 10 to accommodate a display supporter 31 of the supporter 30 (to be described later). The supporter accommodator 15 forms an accommodating space therein, in a non-circular shape corresponding to a rotation preventor 32 of the display supporter 31 (to be described later). Also, the supporter accommodator 15 is coupled to the display supporter 31 by a screw (not shown) to prevent a separation of the display supporter 31 from the display 10.

Each of the supporters 30 may be shaped like elongated bars, to thereby couple a first part thereof to the display 10, and a second part thereof to the base 20. The supporters 30 comprise the display supporter 31 which is integrally coupled to the display 10, and a base supporter 35 which is rotatably coupled to the bases 20 by a rotating shaft 40. The supporters 30 are provided as a pair which are spaced from each other on the display 10, corresponding to the respective bases 20. Alternatively, there may be provided three or more supporters 30 to be spaced from each other on the display 10.

The display supporter 31 is provided on an upper part of the supporter 30 to be coupled to the supporter accommodator 15 of the display 10. The display supporter 31 may be shaped like a bar to be accommodated to the supporter accommodator 15 without difficulty. The rotation preventor 32 is evenly provided in a part of the display supporter 31 to prevent the display supporter 31 from being rotated with respect to the supporter accommodator 15 while coupled to the supporter accommodator 15. Thus, the rotation preventor 32 may prevent the supporter 30 from being rotated when the base 20 rotates. Alternatively, the base 20 may rotate together with the supporter 30 without the additional rotation preventor 32.

Referring to FIG. 5, the base supporter 35 is provided on a lower part of the supporter 30 to be coupled with the base 20. The base supporter 35 comprises a shaft coupler 36 which has a hollow shape to accommodate and couple with the rotating shaft 40. A separation preventing pin 48 penetrates a pin insertion part 37 provided in the base supporter 35, to thereby couple the base supporter 35 with the rotating shaft 40 inserted into the shaft coupler 36. A projection supporter coupler 38 is provided in the base supporter 35 to accommodate and couple with a projection supporter 55 of a rotation angle limiter 50 (to be described later).

The rotating shaft 40 comprises a flanged part 43 which is provided in a first end of the rotating shaft 40 having a flange provided on the outside, a hollow part 41 which penetrates a center thereof, and an insertion part 45 which is provided in a second end thereof to be inserted into the shaft coupler 36 of the base supporter 35.

The flanged part 43 prevents the base 20 from being separated from the base supporter 35, and the flange thereof presses a circumferential part of a shaft accommodator 23 of the base 20 (to be described later) to generate a predetermined friction force when the base 20 rotates with respect to the base supporter 35. A washer 47 is provided between the flanged part 43 and the base 20 so that the base 20 receives a rotation friction force properly with respect to the flanged part 43.

The insertion part 45 penetrates the shaft accommodator 23 of the base 20 (to be described later) and is inserted and coupled to the shaft coupler 36 of the base supporter 35. The insertion part 45 is knurled to form wrinkles in an insertion direction, and is pressed and inserted to the shaft coupler 36 of the base supporter 35. Thus, the rotating shaft 40 may be prevented from being separated or relatively rotated with respect to the shaft coupler 36 of the base supporter 35. The insertion part 45 may comprise a pin coupler 46 to be coupled with the separation preventing pin 48 which passes through the pin insertion part 37 of the base supporter 35. As the base supporter 35 is coupled with the insertion part 45 of the rotating shaft 40 by the separation preventing pin 48, the rotating shaft 40 may be prevented from being separated from the shaft coupler 36 of the base supporter 35 through a hole 23 formed on the base 20.

When the display apparatus 1 is safely seated on a jig (not shown) to be moved by a moving belt (not shown), etc. during an assembly process, the hollow part 41 may be coupled with a jig pin (not shown) which protrudes from the jig (not shown)

so that the display apparatus 1 is more safely supported, without falling down. In an embodiment of the present general inventive concept, the shaft coupler 36 of the base supporter 35 has a hollow shape to make the jig pin (not shown) protruding from the jig (not shown) inserted thereto more deeply.

Figure 6:
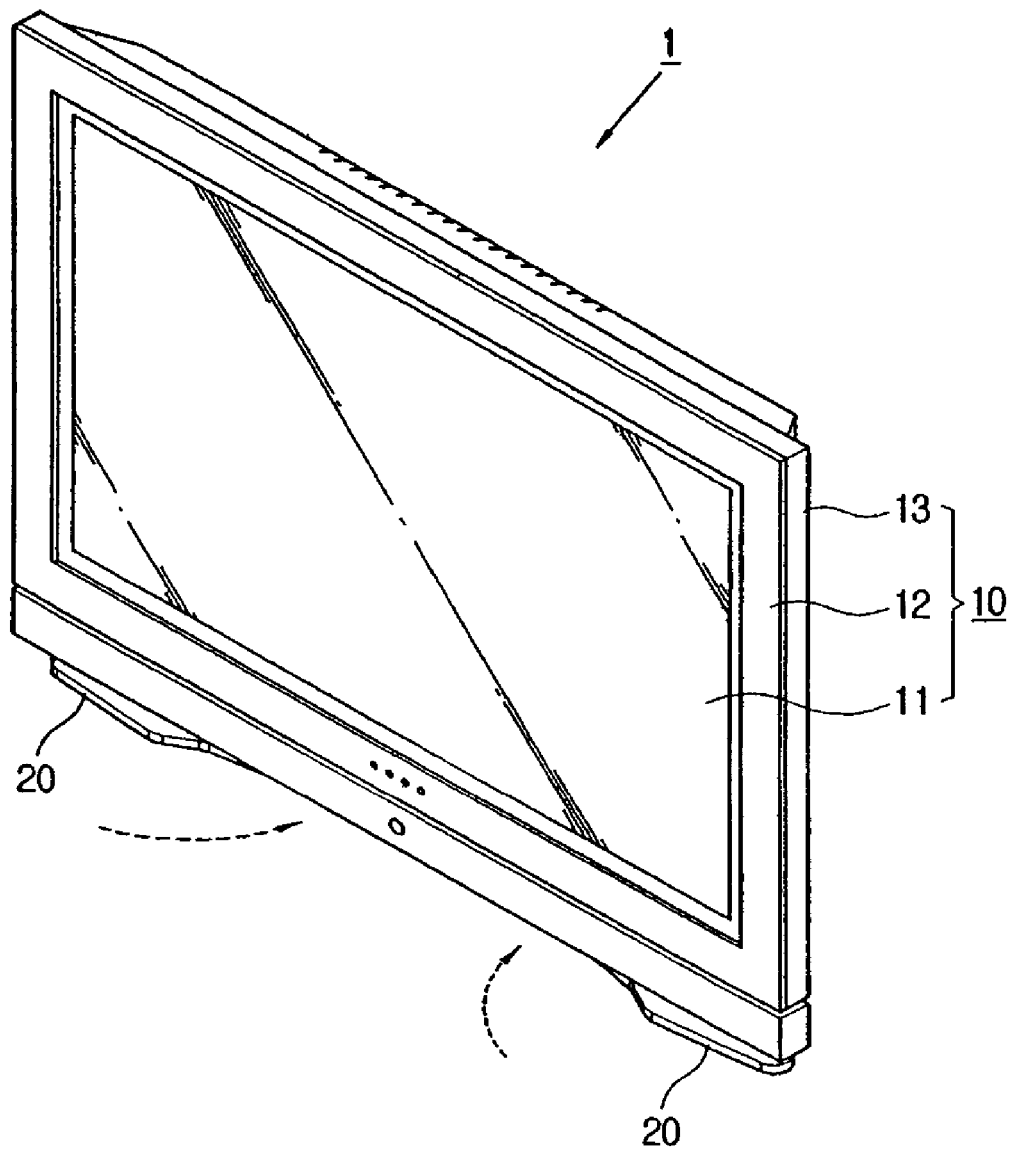
FIG. 6 is an operational perspective view illustrating the base of the display apparatus of FIG. 2.
Figure 7:
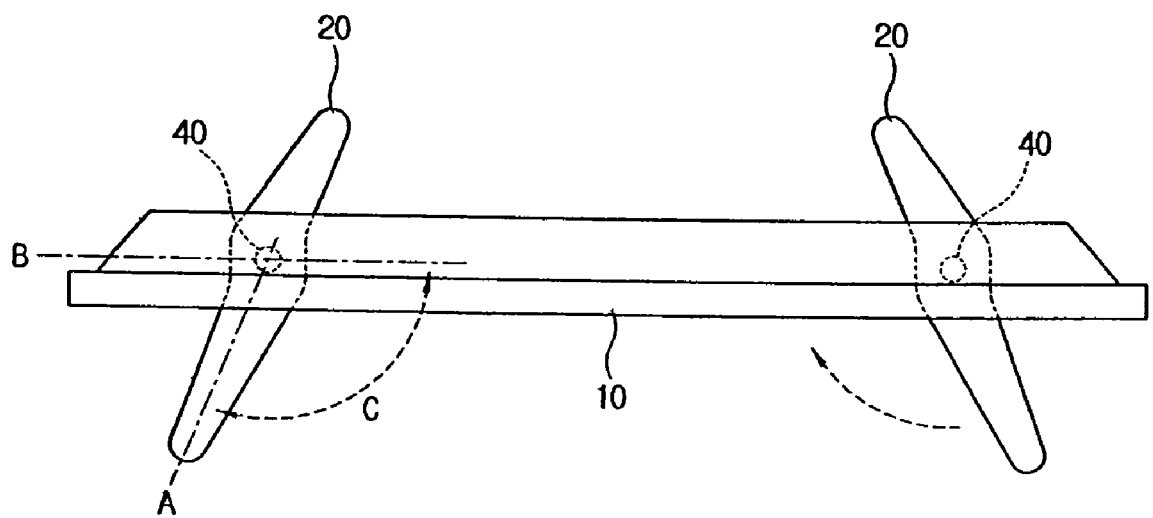
FIGS. 7 and 8 illustrate an unfolding position and a folding position of the base of the display apparatus of FIG. 2.
Figure 8:
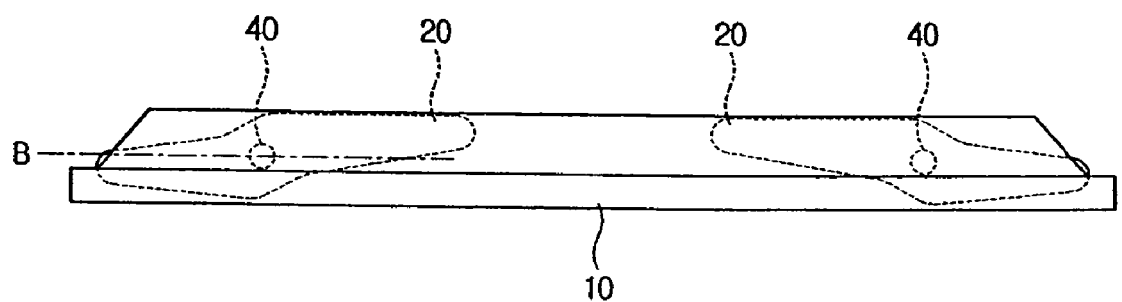

FIG. 6 is an operational perspective view illustrating the base of the display apparatus of FIG. 2. FIGS. 7 and 8 illustrate an unfolding position and a folding position of the base of the display apparatus of FIG. 2. Referring to FIGS. 5 and 6, each of the bases 20 comprise a base main body 21 which is stably seated on a predetermined installing surface such as a table (not shown), and the shaft accommodator 23 which is provided in the base main body 21 to accommodate the rotating shaft 40. In an example of the present general inventive concept, the bases 20 may be provided as a pair to be spaced from each other, but the bases 20 are not limited thereto. Alternatively, there may be provided three or more bases 20. Referring to FIGS. 6-8, the respective bases 20 may rotate between a folding position "B" in which a lengthwise direction of the bases 20 is directed towards leftward and rightward directions as a lengthwise direction of a lower surface of the display 10 (parallel to the major display screen), and a unfolding position "A" in which the lengthwise direction of the base 20 is directed to forward and backward directions of the display 10. The base 20 may be coupled with the display 10 to rotate around an axis of upward and downward directions of the lengthwise direction of the supporter 30 to form an angle with the folding position B. Alternatively, the base 20 may rotate with respect to the display 10 integrally with the supporter 30, or may be rotatably coupled with the display 10 without the supporter 30.

The base main body 21 is shaped like a plate which is elongated on a first side. Referring to FIGS. 2 and 7, a length of the base main body 21 in a long side direction is long enough not to make the display 10 fall down in forward and backward directions by a predetermined external force in the unfolding position A. A width of the base main body 21, i.e., a length of the base main body 21 in a short side direction, may be thinner than a thickness of the display 10 in forward and backward directions to be disposed in the lower part of the display 10 in the folding position B, as illustrated in FIGS. 6 and 8. Alternatively, the width of the base main body 21 may be similar to the thickness of the display 10 or thicker than that of the display part 10.

Referring to FIGS. 4 and 5, the shaft accommodator 23 penetrates a center part of the base main body 21. The shaft accommodator 23 is supported by the flanged part 43 of the rotating shaft 40 not to be separated from the supporter 30.

The display apparatus 1 according to the present embodiment may further comprise a rotation angle limiter 50 which limits a rotation angle of the base 20 with respect to the display 10.

The rotation angle limiter 50 comprises a guide slot 51 which is shaped like a circular arc and provided in either one of the bases 20 and the supporters 30, and a guide projection 53 which is provided in the other one of the base 20 and the supporter 30 to be accommodated to the guide slot 51.

The guide projection 53 is provided in the supporter 30 as an example of the present general inventive concept. That is, the guide projection 53 may be accommodated and coupled with the projection supporter coupler 38 which is depressed from a lower surface of the supporter 30 while being coupled with the projection supporter 55. If the guide slot 51 is provided in the supporter 30, the guide projection 53 may be provided in the base 20.

In an example of the present general inventive concept, the guide slot 51 is formed on at least one of the bases 20 along the shaft accommodator 23 in the circular arc shape. In another example of the present general inventive concept, the guide slot 51 limits a rotation angle range C of the base 20 to approximately 110° by the guide projection 53. That is, the guide slot 51 penetrates the base 20 with the angle range of approximately 110° to make the base 20 rotate between the folding position "B" and the unfolding position "A". Alternatively, the guide slot 51 may comprise other angle ranges including 90° or 70°.

With this configuration, a method of assembling the display apparatus 1 according to the present invention will be described.

First, the display supporter 31 of the supporters 30 is inserted into the supporter accommodator 15 of the display 10. The supporters 30 may be prevented from being rotated with respect to the display 10 by the rotation preventor 32 of the display supporter 31. Then, the supporter accommodator 15 is coupled with the display supporter 31 by a screw (not shown) to prevent the supporters 30 from being separated from the supporter accommodator 15 of the display 10. After a projection supporter 55, which is coupled with the guide projection 53, is inserted into the projection supporter coupler 38 of the supporter 30, the shaft accommodator 23 of the base 20 is placed on a lower surface of the base supporter 35 of the supporter 30. The rotating shaft 40 is pressed and inserted into the shaft accommodator 23 and the base supporter 35, and the separation preventing pin 48 is coupled with the pin insertion part 37 of the base supporter 35 and the pin coupler 46 of the rotating shaft 40. Thus, the rotating shaft 40 may be prevented from being separated from the base supporter 35. The washer 47 is provided between the flanged part 43 of the rotating shaft 40 and the shaft accommodator 23 of the base 20, and between the shaft accommodator 23 of the base 20 and the base supporter 35. The bases 20 may be rotated with respect to the supporters 30 with the predetermined friction force through the washer 47. Thus, the packaging volume is decreased as the base 20 are rotated to the folding position B when the display apparatus 1 is packed. Further, the base 20 is rotated to the unfolding position A, to thereby stably support the display part 10 on the predetermined installing surface to use the display apparatus 1.

As described above, the display apparatus according to the present general inventive concept may be packed without difficulty and decrease a packing volume thereof as the bases are not packed separately from the display apparatus. Further, the display apparatus according to the present general inventive concept is not required to be coupled with the bases to be used, thereby providing more convenience for a user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus, comprising:
   a display having a thin display panel to display an image thereon;
   a base part coupled to the display along an elongated bottom surface thereof and on an axis extending substantially perpendicular to the elongated bottom surface on the display to rotate about the axis while remaining on a plane perpendicular to the thin display panel;
   a supporter part disposed between and to couple the base part and the display; and a supporter accommodator part formed on a lower surface of the display to accommodate the supporter part, wherein the supporter part comprises a plurality of supporters coupled with the display to be spaced from each other, and the base part comprises a plurality of bases rotatably coupled with corresponding ones of the supporters, wherein each supporter of the plurality of supporters comprising a display supporter fixedly coupled within the display and a base supporter rotatably coupled to the base part, and wherein the supporter accommodator part comprises a plurality of supporter accommodators formed on a lower surface of the display to accommodate corresponding ones of the display supporters.

2. The display apparatus according to claim 1, wherein the base part has an elongated plate like shape, and rotates between a folding position in which a lengthwise direction of the base part is directed to a leftward and rightward direction as a lengthwise direction of a lower surface of the display and an unfolding position in which the lengthwise direction of the base part is directed to a forward and backward direction of the display.

3. The display apparatus according to claim 2, further comprising:
a rotating shaft to rotatably couple the base part and the supporter part,
wherein the rotating shaft is a hollow tube.

4. The display apparatus according to claim 3, wherein the base supporter part is rotatably coupled with the base part by the rotating shaft.

5. The display apparatus according to claim 2, further comprising:
a rotation angle limiter to limit a rotation angle of the base part with respect to the display.

6. The display apparatus according to claim 5, wherein the rotation angle limiter comprises:
a guide slot provided on one of the base part and the supporter part in a circular arc shape; and
a guide projection provided in the other one of the base part and the supporter part to be accommodated to the guide slot.

7. The display apparatus according to claim 2, wherein a width of the base part is thinner than a thickness of the display.

8. The display apparatus according to claim 1, wherein the base part comprises a pair of bases spaced apart from each other.

9. A display apparatus, comprising:
a display having a thin display panel to display an image thereon;
a base part coupled to the display along an elongated bottom surface thereof and on an axis extending substantially parallel to an image display part on the display to rotate about the axis; and
a supporter part disposed between and to couple the base part and the display such that the base part rotates with respect to the display while remaining on a plane perpendicular to the image display part; and
a supporter accommodator formed on a lower surface of the display to accommodate the supporter part,
wherein the base part comprises a plurality of bases, and the supporter part comprises a plurality of supporters connected between the display and corresponding ones of the bases,
wherein each supporter of the plurality of supporters comprising a display supporter fixedly coupled within the display and a base supporter rotatably coupled to the base part,
wherein the supporter accommodator part comprises a plurality of supporter accommodators formed on a lower surface of the display to accommodate corresponding ones of the display supporters.

10. The display apparatus of claim 9, wherein: the bases each have a width and a length;
the width is equal to or narrower than a thickness of the display in a direction perpendicular to a direction of a screen of the display on which the image is displayed; and
the length is shorter than a length of the display in a direction of the screen of the display.

11. The display apparatus of claim 9, wherein the bases are spaced apart from each other by a distance greater than a length of each base.

12. The display apparatus of claim 9, wherein the supporters are spaced apart from each other by a distance greater than a length of the base part.

13. The display apparatus of claim 9, wherein the bases independently rotate with respect to the display.

14. The display apparatus of claim 9, wherein the base part has a length in a longitudinal direction thereof and a width in a widthwise direction perpendicular to the longitudinal direction, the width of the base part is narrower than a thickness of the display in a direction perpendicular to the display.

15. The display apparatus of claim 9, wherein the display comprises a screen on which the image is displayed and the base maintains a distance with the display when rotating with respect to the display.

16. The display apparatus of claim 15, wherein the base part rotates between a folding position where the base part and the display overlap and an unfolding position having an angle with the folding position.

17. The display apparatus of claim 9, further comprising:
a support shaft to couple the base part to the supporter part,
wherein the base part comprises a recess portion to accommodate the support shaft and a hole through which the support shaft is inserted to couple the base to the supporter part.

18. A display apparatus, comprising:
a display having a thin display panel to display an image thereon;
a base part comprising a plurality of bases;
a plurality of supporters spaced-apart from each other and coupled to the display, where each supporter comprises a display supporter integrally fixed within the display and a base supporter rotatably coupled to the base part; and
a plurality of supporter accommodators formed on a lower surface of the display to accommodate corresponding ones of the display supporters,
wherein the plurality of bases are rotatably coupled to corresponding ones of the supporters along an elongated bottom surface of the display and on an axis extending substantially parallel to an image display part on the display to rotate about the axis while remaining on a plane perpendicular to the image display part.

* * * * *